W. N. BORDER & S. P. LOVE.
SHOCK ABSORBER.
APPLICATION FILED MAR. 14, 1911.
1,001,343.
Patented Aug. 22, 1911.
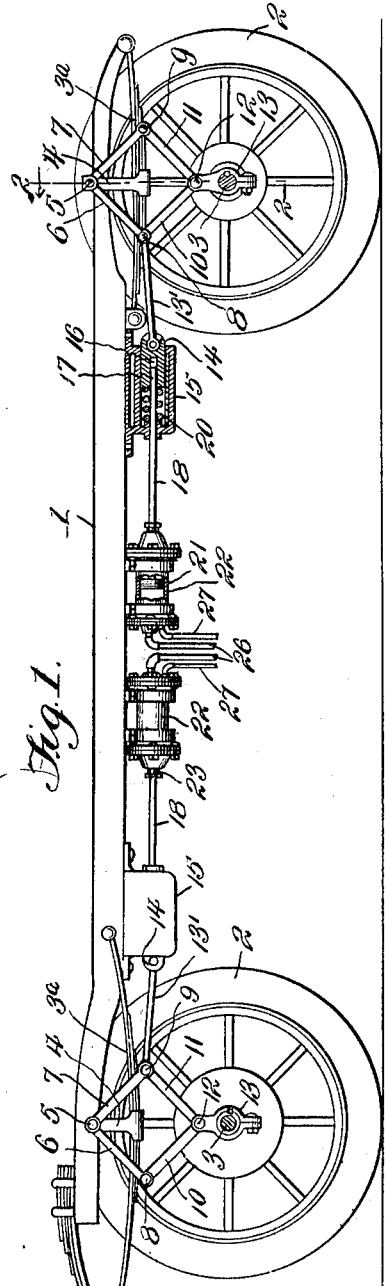
Inventor
William N. Border
Samuel P. Love
By Victor J. Evans,
Attorney
Witnesses

UNITED STATES PATENT OFFICE.

WILLIAM N. BORDER AND SAMUEL P. LOVE, OF TRENTON, MISSOURI.

SHOCK-ABSORBER.

1,001,343.

Specification of Letters Patent.

Patented Aug. 22, 1911.

Application filed March 14, 1911. Serial No. 614,354.

*To all whom it may concern:*

Be it known that we, WILLIAM N. BORDER and SAMUEL P. LOVE, citizens of the United States, residing at Trenton, in the county of Grundy and State of Missouri, have invented new and useful Improvements in Shock-Absorbers, of which the following is a specification.

This invention relates to shock absorbers for automobiles and other vehicles, the object in view being to provide simple, effective and reliable means for taking up and absorbing the shocks, jolts and jars in the running of the vehicle, eliminating the objectionable vibrations customarily produced, and evenly and uniformly distributing the various strains so as to reduce the liability of injury to the vehicle.

The invention consists of the features of construction, combination and arrangement of parts, hereinafter fully described and claimed, reference being had to the accompanying drawings, in which:—

Figure 1 is a side elevation, showing the application of the invention to a portion of the frame and running gear of an automobile. Fig. 2 is an enlarged detail section on the line 2—2 of Fig. 1. Fig. 3 is a vertical longitudinal section through one of the secondary cushioning cylinders. Fig. 4 is a similar view through one of the primary cushioning cylinders. Fig. 5 is an enlarged detail view of one of the systems of levers.

Referring to the drawings, 1 designates one of the side bars of the frame or chassis of an automobile or similar vehicle, and 2 the wheels at one side of the vehicle, which wheels are mounted in the usual manner upon transverse shafts 3. We have shown the running gear at one side only of the vehicle sufficiently to illustrate the invention, as the construction is duplicated at each side of the vehicle.

Secured to the front and rear ends of the bar 1 are suspension springs 3ª, and to the intermediate portion of each of these springs is attached an upstanding bracket or hanger 4 carrying a fulcrum or bolt 5, on which are pivotally mounted the upper convergent ends of a pair of levers 6 and 7. The lower ends of these levers 6 and 7 are pivotally connected by fulcrum pins or bolts 8 and 9 with the upper divergent ends of a pair of levers 10 and 11, pivotally mounted at their lower or convergent ends upon a pivotal bolt or pin 12 carried by a bracket or sleeve 13 mounted on the contiguous end of the adjacent axle 3.

Pivotally connected at one end of the pivot pin or bolt 8 is a link or connecting rod 13', pivotally attached at its opposite or inner end to a block or head 14 slidably mounted in a casing or guideway 15 secured to the bar 1. Said block or head or casing 14 is provided with a socket 16 slidably receiving the outer end 17 of a piston rod 18, which slides through a suitable bearing 19 mounted on the casing 15 and has its portion within the casing inclosed by a cushioning spring 20, arranged between the bearing member 19 and the inner end of the block or head 14.

The inner end of the rod 18 carries a piston head 21 movable in a cylinder 22, the rod extending through a stuffing box 23 in the outer end of said cylinder. The inner end or head 24 of the cylinder is provided with a check valve air inlet 25 with which communicates an air feed pipe 26, through which air is admitted to be drawn into the cylinder on the outward movement of the piston head, it being understood, of course, that the pipe 26 may communicate with any source of air supply under pressure. Also connected with the head 24 is a check valve exhaust pipe 27, through which the air may discharge for the inward movement of the piston.

It will be observed that the construction described provides a diamond-shaped yielding frame or system of toggle levers connecting each suspension spring 3ª with the contiguous end of the adjacent axle 3, through which a relative yielding or cushioning motion between the axle and the frame or chassis is permitted, also that the cushioning devices associated with each set of levers are disposed between the same and the center of the bar 1, and it will thus be seen that the yielding or shock-absorbing connections between the axle and frame will coöperate with the spring of the vehicle to prevent any sudden shock or jar from exerting its full force on the spring or frame. Should the tendency of the shock be to throw the vehicle body upward, the force will contract the system of levers by drawing the fulcrum points 8 and 9 inwardly toward each other, whereby the shock will be taken up. On the other hand, should the shock tend to throw the body of the vehicle downward, the system of levers would be extended in a longitudinal direction, or the fulcrum points 8 and 9 be spread a farther distance apart. As a result the connecting rod 13 will be moved rearwardly, thus sliding the block 14 rearwardly in the casing 15 against the resistance of the spring 20, whereby said spring will be caused to coöperate with the spring 3ª to take up and absorb the shock. Should a violent downward movement of the vehicle body ensue, movement of the vehicle body, and that of the piston cylinder provide a secondary cushioning device to coöperate with said primary cushioning device to absorb any heavier shocks, by which all strains to which the vehicle body may be subjected will be absorbed in a simple and effective manner.

It will be understood that the springs 3ª and the primary cushioning devices will be sufficient under ordinary conditions to take up all of the ordinary vibrations and that the air cushioning devices are not brought into play unless the vehicle body is subjected to heavy shocks and jars liable under ordinary conditions to damage the body or chassis.

Having thus described our invention, we claim:—

1. In a vehicle, a frame, a suspension spring carried thereby, an axle, a system of toggle levers connecting the spring with the axle, a casing, an element slidably mounted in the casing, a spring within the casing opposing the sliding movement of said element, a rod connecting said element with the toggle lever, a pneumatic cylinder, and a piston operating therein and adapted to be engaged and moved by said sliding element upon a predetermined preliminary movement of the latter.

2. In a vehicle, a frame, a suspension spring carried thereby, an axle, a system of toggle levers connecting the spring with the axle, a casing, an element slidably mounted in the casing, a spring within the casing opposing the sliding movement of said element, a rod connecting said element with the toggle levers, a pneumatic cylinder, and a piston operating therein and having a telescopic connection with said sliding element, said connection permitting the sliding element to have a limited independent movement and adapted to permit said piston to be positively engaged and moved by said sliding element at the limit of the limited independent sliding movement of the latter.

3. In a vehicle, a frame, a suspension spring carried thereby, an axle, a system of toggle levers connecting the spring and axle, a pneumatic cylinder, a piston operating in said cylinder, a casing receiving the outer end of the piston rod, a sliding head movable on the end of the rod and adapted to engage the same upon a predetermined sliding movement, a cushioning spring for resisting the movement of the sliding head, and a connection between the sliding head and the system of toggle levers.

4. In a vehicle, a frame, a suspension spring carried thereby, an axle, a system of toggle levers connecting the spring and axle, a pneumatic cushioning device including a piston, a cushioning spring, a primary cushioning member movable against the resistance of said spring and adapted to engage the piston to impart movement thereto when said spring is compressed, and a connection between said member and the system of toggle levers.

In testimony whereof we affix our signatures in presence of two witnesses.

WILLIAM N. BORDER.
SAMUEL P. LOVE.

Witnesses:
W. H. BAILEY,
WM. LAUNDY.